US012699593B2

(12) United States Patent
Moorthy

(10) Patent No.: US 12,699,593 B2
(45) Date of Patent: Aug. 4, 2026

(54) DYNAMIC ALLOCATION OF COMPUTATIONAL RESOURCES TO APPLICATION MICRO-SERVICES

(71) Applicant: Rakuten Mobile, Inc., Tokyo (JP)

(72) Inventor: Ramkumar Moorthy, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 527 days.

(21) Appl. No.: 18/321,772

(22) Filed: May 23, 2023

(65) Prior Publication Data

US 2024/0394100 A1 Nov. 28, 2024

(51) Int. Cl.
*G06F 9/46* (2006.01)
*G06F 9/48* (2006.01)
*G06F 9/50* (2006.01)

(52) U.S. Cl.
CPC .......... *G06F 9/5016* (2013.01); *G06F 9/4881* (2013.01); *G06F 9/5072* (2013.01)

(58) Field of Classification Search
CPC ..... G06F 9/5016; G06F 9/4881; G06F 9/5072
See application file for complete search history.

(56) References Cited

U.S. PATENT DOCUMENTS

| | | | | |
|---|---|---|---|---|
| 12,254,346 B1 * | 3/2025 | Sorenson, III | ........ | G06F 9/4875 |
| 2017/0351552 A1 * | 12/2017 | Wong | .................. | G06F 9/5061 |
| 2022/0222117 A1 * | 7/2022 | Kutch | .................. | G06F 9/5005 |

FOREIGN PATENT DOCUMENTS

CN 111158895 A * 5/2020 ........... G06F 9/5027

OTHER PUBLICATIONS

Shelar, Dynamic Resources allocation using Priority Aware scheduling in Kubernetes, National College of Ireland, 2019, 42 pages. (Year: 2019).*

* cited by examiner

*Primary Examiner* — Diem K Cao
(74) *Attorney, Agent, or Firm* — HAUPTMAN HAM, LLP

(57) ABSTRACT
Dynamic allocation of resources to application micro-services is performed by receiving, by an agent executed on a server of a cloud computing environment, a request to provision a container for a micro-service of an application, provisioning, by the agent, the container for the micro-service on the worker server with an allocated resource amount, detecting, by the agent, a resource consumption amount of the micro-service, increasing, by the agent in response to the resource consumption amount exceeding an upper resource consumption threshold value, the allocated resource amount by a resource increment, and reducing, by the agent in response to the resource consumption amount exceeding a lower resource consumption threshold value, the allocated resource amount by the resource increment.

17 Claims, 8 Drawing Sheets

330          332          334     336     338

| ID | Micro-service | Instance | vCPU | MEM |
|----|---------------|----------|------|-----|
| 1 | Configuration | 1 | 1 | 1.0GB |
| 2 | Resources | 1 | 1 | 1.0GB |
| 3 | Subscribers | 4 | 4 | 4.0GB |
| 4 | Transport Manager (Transport, Manager) | 1 | 2 | 2.0GB |
| 5 | Notifications | 1 | 1 | 1.0GB |
| 6 | Certifications | 3 | 1 | 3.0GB |

*FIG. 3*

DYNAMIC ALLOCATION OF COMPUTATIONAL RESOURCES TO APPLICATION MICRO-SERVICES

BACKGROUND

Technical Field

This description relates to dynamic allocation of computational resources to application micro-services.

Background

Radio Access Networks (RAN) utilizing Open RAN (O-RAN), where the interfaces and protocols between the RAN components are open and interoperable, have emerged. Open RAN splits the functions of an access point of a cell site among a central unit (CU), a distributed unit (DU), and a radio unit (RU). In some O-RAN systems, each instance of a CU and a DU exists as an application executed in a cloud native environment.

SUMMARY

According to at least some embodiments of the subject disclosure, dynamic allocation of resources to application micro-services is performed by receiving, by an agent executed on a server of a cloud computing environment, a request to provision a container for a micro-service of an application, provisioning, by the agent, the container for the micro-service on the worker server with an allocated resource amount, detecting, by the agent, a resource consumption amount of the micro-service, increasing, by the agent in response to the resource consumption amount exceeding an upper resource consumption threshold value, the allocated resource amount by a resource increment, and reducing, by the agent in response to the resource consumption amount exceeding a lower resource consumption threshold value, the allocated resource amount by the resource increment.

Some embodiments include the instructions in a computer program, the method performed by the processor executing the instructions of the computer program, and an apparatus that performs the method. In some embodiments, the apparatus includes a controller including circuitry configured to perform the operations in the instructions.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a table of micro-services of an O-RAN application, according to at least some embodiments of the subject disclosure.

DETAILED DESCRIPTION

Figure 1:
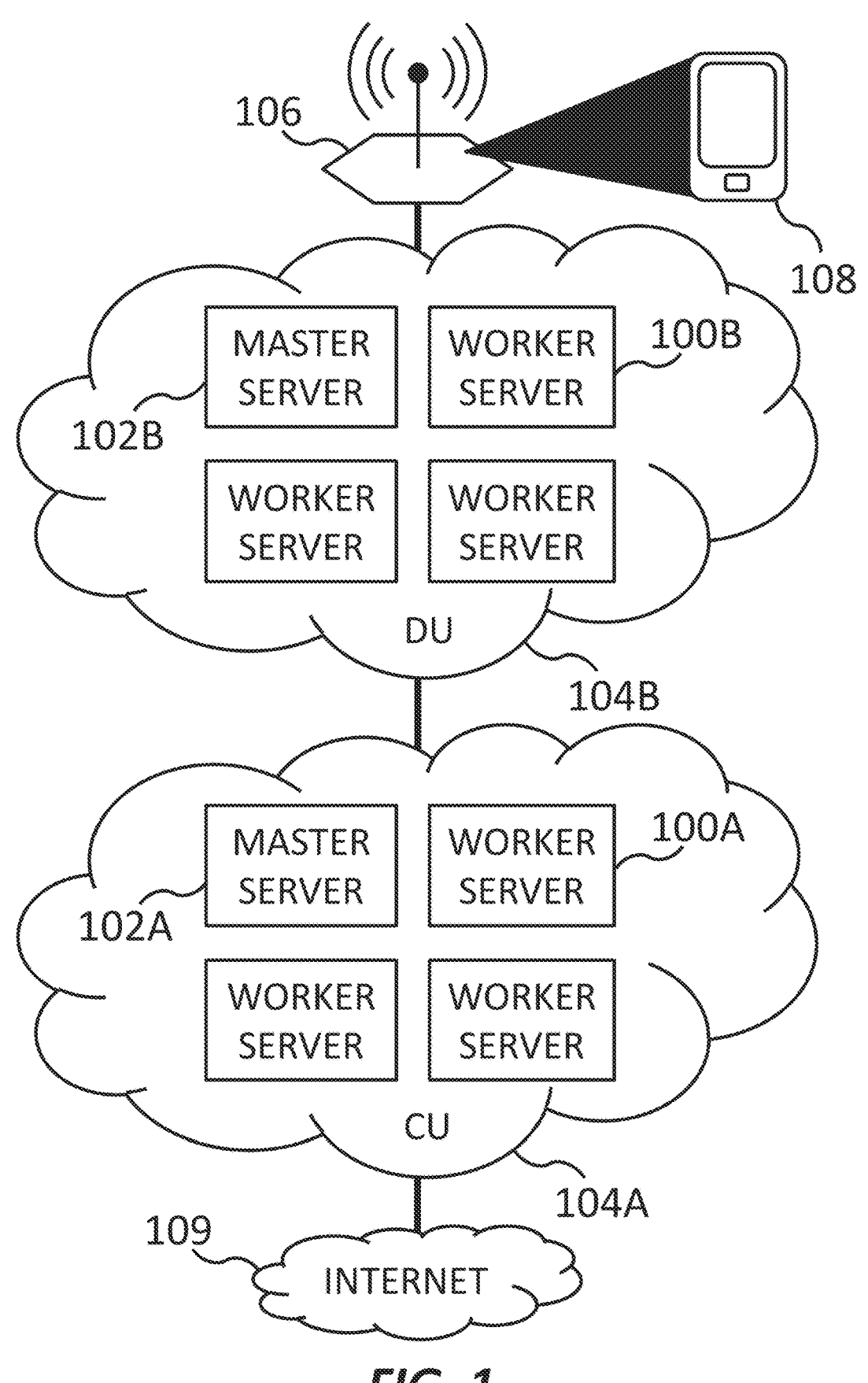
FIG. 1 is a schematic diagram of an O-RAN system, according to at least some embodiments of the subject disclosure.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

To execute a CU application or a DU application in a cloud native environment, the application is divided into micro-services, each micro-service performing a network function, and each micro-service is provisioned in a container on a server in the cloud native environment. For example, KUBERNETES is a popular platform for orchestrating containers in cloud native environments. A micro-service provisioned in a container on in a cloud native environment is referred to as a Network Function Virtualization (NFV) or a Cloud Network Function (CNF)

Most CNF-based micro-services deployed in a data center use dedicated CPU core resources, and a few micro-services use shared resources. Such micro-services are generally provisioned in individual containers with dedicated CPU cores and dedicated memory. The few micro-services that used shared resources are provisioned in shared containers, which has dedicated CPU cores and memory, and with two micro-services that share the dedicated resources of the container. Many cloud services also offer non-isolated shared resources for a container, but this option is not as desirable for O-RAN applications, because the resources are not guaranteed to be available when needed.

A given cloud server has a fixed amount of bare metal resources, such as a number of CPU cores and an amount of memory. Micro-services may be provisioned in containers with a desired number of CPU cores and amount of memory, but the granularity may be coarse. In some cases, CPU cores are allocated in whole, i.e.—a partial CPU cannot be allocated, and memory is allocated in gigabytes. This means that each micro-service, no matter how small or how seldom active, may require a minimum allocation of one whole CPU core and one gigabyte of memory. If an application's micro-services require just over half of a server's resources, then only one instance of the application can be run the server, and a second instance of the application requires another server.

Certain micro-services have variable load and processing requirements. Such micro-services are generally allocated sufficient resources so as not to be exceeded by load and processing requirements. However, such micro-services may only require all allocated resources for a small amount of time in a given day. For the foregoing reasons, a cloud server running a CU application or a DU application may have many unused resources for a significant amount of the time in a given day.

In at least some embodiments of the subject disclosure, a cloud server includes an agent for dynamically allocating resources of the server to provisioned micro-services of an application. In at least some embodiments, the agent is configured to monitor resource consumption and allocate resources as needed to each micro-service. In at least some embodiments, the agent is configured to move micro-services to an idle area, where a negligible amount of resources are consumed, until scheduled times of activity.

FIG. 1 is a schematic diagram of an O-RAN system, according to at least some embodiments of the subject disclosure. The system includes a CU 104A, a DU 104B, and an access point 106. In at least some embodiments, the system enables communication between a terminal 108 and an internet 109. In at least some embodiments, CU 104A and DU 104B are part of a radio access network, which is a wireless communication network including access points, such as access point 106. In at least some embodiments, the radio access network is configured to operate under 4G standards, 5G standards, or any other wide area radio access network protocol. In at least some embodiments, CU 104A is connected to a plurality of DUs, including DU 104B, and each DU is connected to a plurality of access points, such as access point 106.

CU 104A includes a master server 102A and a plurality of worker servers, such as worker server 100A. In at least some embodiments, master server 102A and the plurality of worker servers are part of a cloud native environment. In at least some embodiments, each worker server, such as worker server 100A, executes one or more CU applications configured to facilitate communication through the radio access network. In at least some embodiments, communication between a given terminal, such as terminal 108, and internet 109 is facilitated by a given worker server, such as worker server 100A, in which the communication between terminal 108 and internet 109 is routed through worker server 100A. In at least some embodiments, communication of the plurality of worker servers is routed through master server 102A. In at least some embodiments, CU 104A includes 3 master servers and 45 worker servers.

DU 104B includes a master server 102B and a plurality of worker servers, such as worker server 100B. DU 104B, master server 102B, and worker server 100B are substantially similar in structure and function to CU 104A, master server 102A, and worker server 100A, respectively, except where described differently. In at least some embodiments, each worker server, such as worker server 100B, executes one or more DU applications configured to facilitate communication through the radio access network.

In at least some embodiments, each server among the master servers and worker servers is a computation device capable of executing instructions to perform operations, such as operations for facilitating communication through the radio access network. In at least some embodiments, each worker server includes a non-transitory computer-readable medium including instructions executable by a processor to cause the processor to perform dynamic allocation of computational resources to application micro-services.

Terminal 108 is in wireless communication with access point 106 through a wide area radio access network protocol, such as 4G standard, 5G standard, etc. In at least some embodiments, terminal 108 is a device having limited computational resources, such as a smart watch, a fitness tracker, and Internet-of-Things (IoT) device, etc., or a device having computational resources for a broader range of capabilities, such as a smart phone, a tablet, a personal computer, etc.

Figure 2:
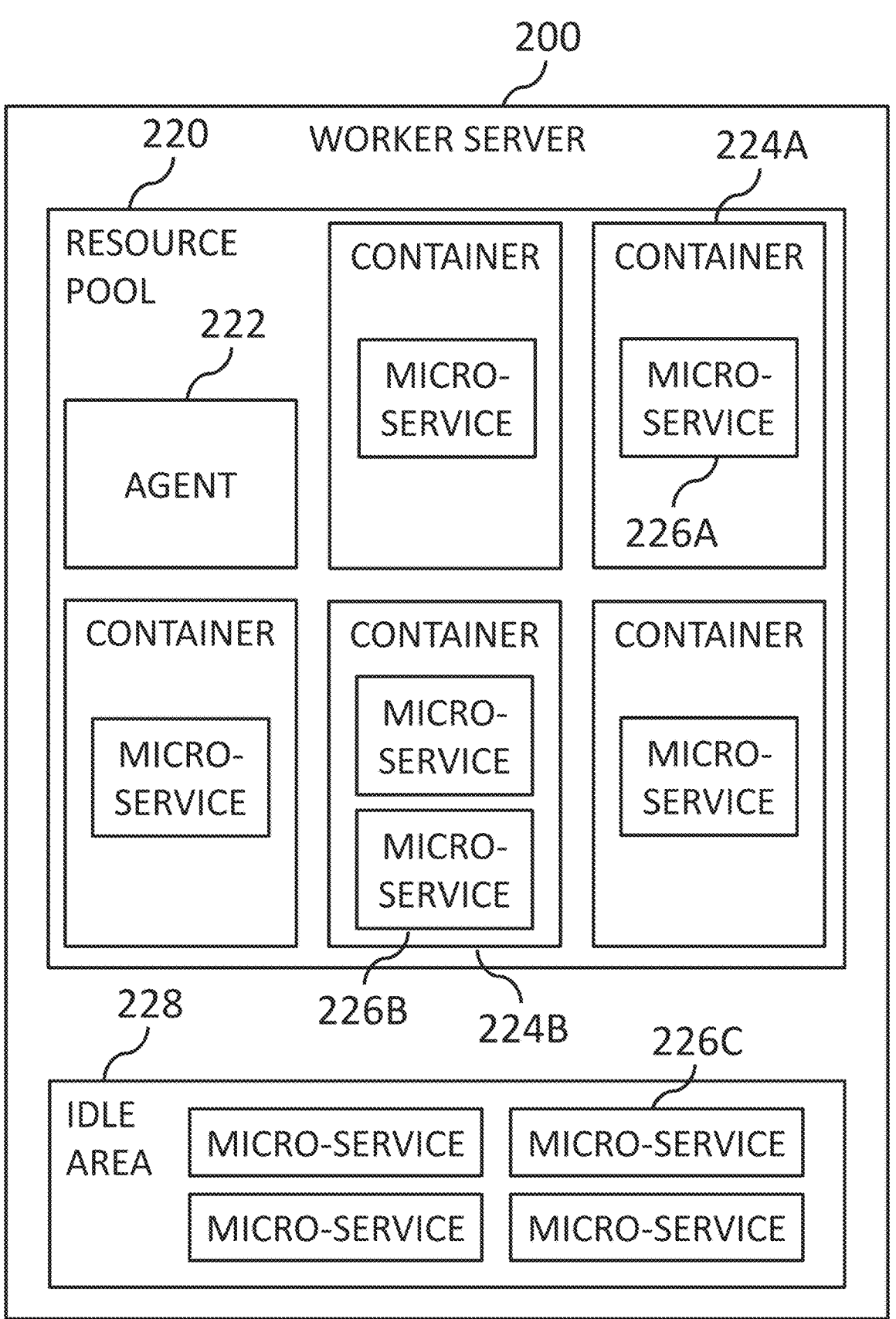
FIG. 2 is a schematic diagram of a server configured to perform dynamic allocation of computational resources to application micro-services, according to at least some embodiments of the subject disclosure.

FIG. 2 is a schematic diagram of a worker server 200 configured to perform dynamic allocation of computational resources to application micro-services, according to at least some embodiments of the subject disclosure. In at least some embodiments, worker server 200 includes a non-transitory computer-readable medium including instructions executable by a processor to cause the processor to perform dynamic allocation of computational resources to application micro-services. Worker server 200 includes a resource pool 220 and an idle area 228. In at least some embodiments, the application is one of a Central Unit (CU) application and a Distributed Unit (DU) application of an Open Radio Access Network (O-RAN) system.

In at least some embodiments, resource pool 220 includes the computational resources of worker server 200, including processing resources, such as CPU cores, and memory resources, such as Random Access Memory (RAM) capacity. Resource pool 220 provides computational resources for an agent 222 and a plurality of containers, such as container 224A and container 224B, each of which hosts a micro-service, such as micro-service 226A and micro-service 226B, and any runtimes requires to execute the micro-service. In at least some embodiments, worker server 200 operates using a container management platform, such as KUBERNETES. The micro-services in containers provided with computational resources in resource pool 220 are provisioned with dedicated resources, such as a number of CPU cores, and an amount of RAM memory. Although most containers host a single micro-service, container 224B hosts two micro-services.

Idle area 228 stores inactive micro-services, such as micro-service 226C. In at least some embodiments, idle area 228 is a reserved Random Access Memory (RAM) area controlled by an operating system kernel of the server. In at least some embodiments, micro-service 226C is scheduled to run once every 15 minutes, once per hour, or some other frequency. In at least some embodiments, micro-service 226C is moved to resource pool 220 for execution at the scheduled frequency. In at least some embodiments, idle area 228 provides inactive micro-services with sufficient storage space to remain on worker server 200 until scheduled for execution.

In at least some embodiments, agent 222 is a program including instructions that, when executed by worker server 200, cause worker server 200 to perform dynamic allocation of the computational resources of resource pool 220 to application micro-services, including micro-services currently provisioned with dedicated computational resources of resource pool 200 and micro-services stored in idle area 228. In at least some embodiments, agent 222 performs the operational flow shown in FIG. 4, which will be explained hereinafter.

FIG. 3 is a table of micro-services 332 of an O-RAN application, according to at least some embodiments of the subject disclosure. In at least some embodiments, the table shows micro-services 332 executed by a server, such as worker server 200 of FIG. 2. The table shows, for each micro-service 332, an identifier 330, a number of instances 334, a number of virtual CPUs 336 allocated to the corresponding micro-service, and an amount of memory 338 allocated to the corresponding micro-service. The Subscribers micro-service includes four instances, and is allocated 4 virtual CPUs and 4.0 gigabytes of memory. In at least some embodiments, each instance is hosted in a separate container. The Transport micro-service includes 2 micro-services, a transport micro-service and a manager micro-service, hosted by a single container.

Figure 4:
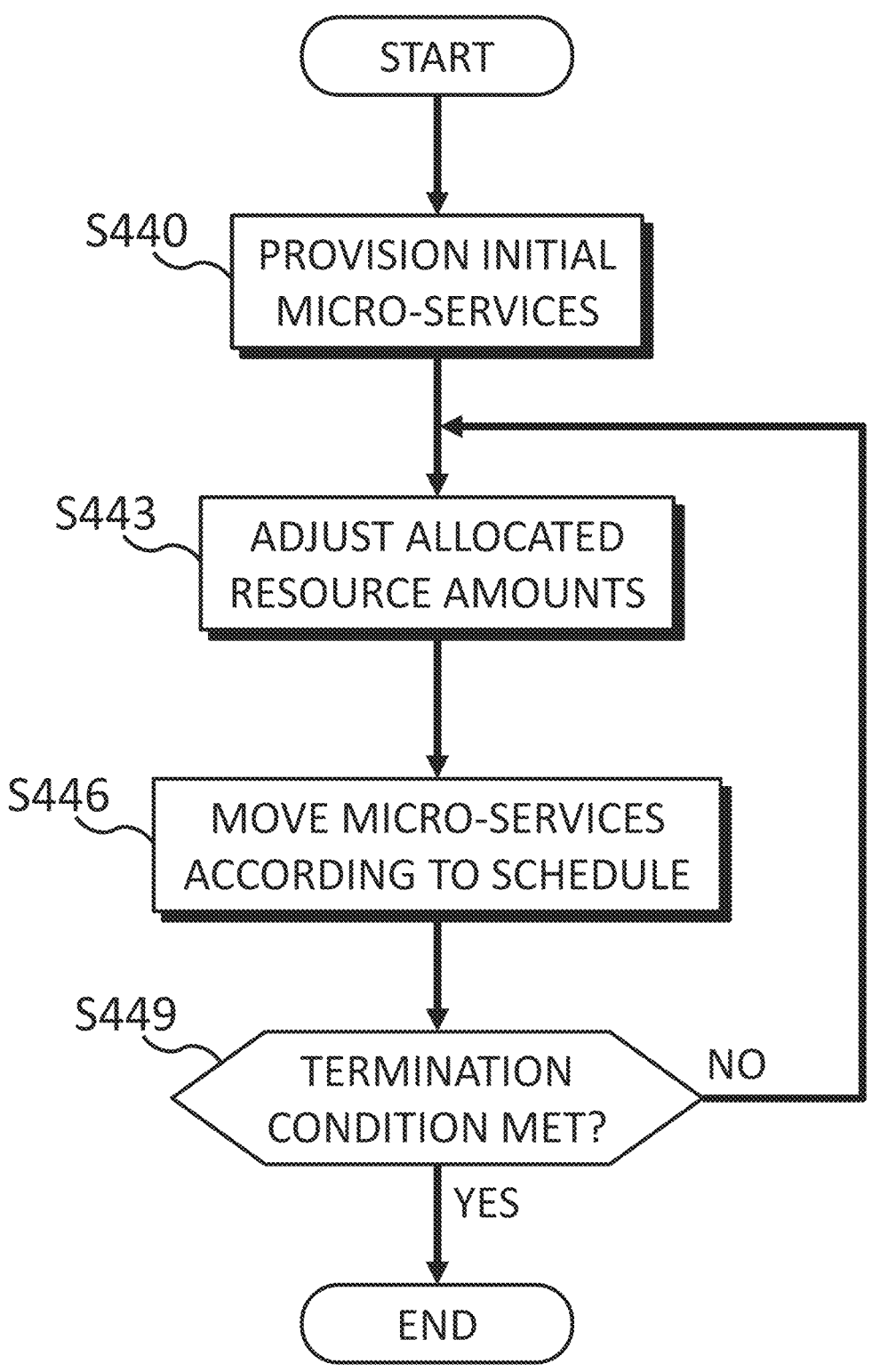
FIG. 4 is an operational flow for dynamic allocation of computational resources to application micro-services, according to at least some embodiments of the subject disclosure.

FIG. 4 is an operational flow for dynamic allocation of computational resources to application micro-services, according to at least some embodiments of the subject disclosure. The operational flow provides a method of dynamic allocation of computational resources to application micro-services. In at least some embodiments, the method is performed by a controller of a server including sections for performing certain operations, such as the controller and server shown in FIG. 8, which will be explained hereinafter.

At S440, a provisioning section of the controller provisions initial micro-services. In at least some embodiments, the provisioning section provisions micro-services of an application for an O-RAN system, such as a CU application or a DU application, in containers on a server of a cloud native environment. In at least some embodiments, the provisioning section performs the operational flow shown in FIG. 5, which will be explained hereinafter.

At S443, a detecting section and an allocating section of the controller adjust allocated resource amounts. In at least some embodiments, the detecting section detects computational resource consumption by each micro-service provisioned on the server. In at least some embodiments, the allocating section increases or decreases the amount of allocated resources to each micro-service. In at least some embodiments, the detecting section and the allocating section perform the operational flow shown in FIG. 6, which will be explained hereinafter.

At S446, the allocating section and a scheduling section of the controller move micro-services according to a schedule. In at least some embodiments, the scheduling section instructs the allocating section to allocate resources to micro-services at the scheduled time. In at least some embodiments, the allocating section and the scheduling section perform the operational flow shown in FIG. 7, which will be explained hereinafter.

At S449, the controller or a section thereof determines whether a termination condition is met. In at least some embodiments, a termination condition is met when the application is no longer desired. If the termination condition is not met, then the operational flow returns to allocated resource amount adjustment at S443. If the termination condition is met, then the operational flow ends.

Figure 5:
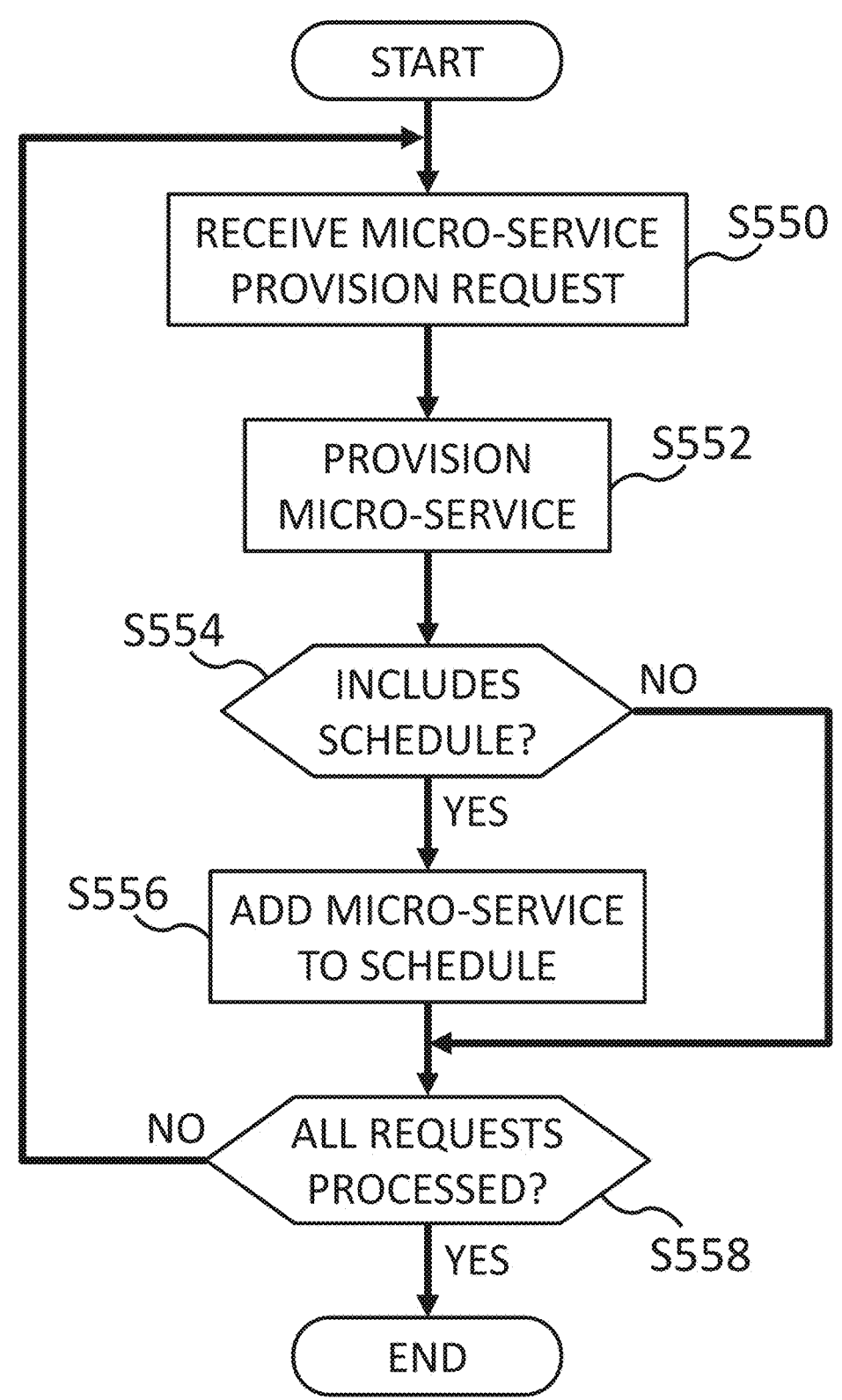
FIG. 5 is an operational flow for provision of initial micro-services, according to at least some embodiments of the subject disclosure.

FIG. 5 is an operational flow for provision of initial micro-services, according to at least some embodiments of the subject disclosure. The operational flow provides a method of provision of initial micro-services. In at least some embodiments, the method is performed by a controller of a server including sections for performing certain operations, such as the controller and server shown in FIG. 8, which will be explained hereinafter.

At S550, the provisioning section or a sub-section thereof receives a micro-service provision request. In at least some embodiments, the provisioning section receives, by an agent executed on a server of a cloud computing environment, a request to provision a container for a micro-service of an application. In at least some embodiments, the provisioning section receives the provision request from an orchestrator. In at least some embodiments, the provisioning section receives the request through an Application Programming Interface (API).

At S552, the provisioning section or a sub-section thereof provisions the micro-service. In at least some embodiments, the provisioning section provisions, by the agent, the container for the micro-service on the worker server with an allocated resource amount. In at least some embodiments, the provisioning section instructs the allocating section to allocate a requested initial resource amount.

At S554, the provisioning section or a sub-section thereof determines whether the provision request includes a schedule. In at least some embodiments, the provisioning section determines whether a scheduling request is attached to the provision request. In at least some embodiments, the provisioning section detects a scheduled frequency of execution within a code of the corresponding micro-service. If the provisioning section determines that the provision request includes a schedule, then the operational flow proceeds to micro-service schedule addition at S556. If the provisioning section determines that the provision request does not include a schedule, then the operational flow proceeds to determine whether all requests have been processed at S558.

At S556, the scheduling section or a sub-section thereof adds the micro-service to a schedule. In at least some embodiments, the scheduling section receives, by the agent, a schedule associated with the micro-service, and adds the micro-service to the schedule. In at least some embodiments, the schedule includes start times and stop times for each of a plurality of micro-services. In at least some embodiments, the agent receives a schedule associated with each micro-service among the plurality of micro-services. In at least some embodiments, the agent staggers the start times and the end times among the plurality of schedules associated with the plurality of micro-services.

At S558, the provisioning section or a sub-section thereof determines whether all requests have been processed. In at least some embodiments, the agent receives a plurality of requests, each request to provision a container among a plurality of containers for a micro-service among a plurality of micro-services of the application. In at least some embodiments, as iterations proceed, the agent provisions the plurality of containers for the plurality of micro-services of the application. In at least some embodiments, the agent provisions a plurality of containers for a plurality of micro-services of a second application. If the provisioning section determines that unprocessed requests remain, then the operational flow returns to micro-service provision request reception at S550 for another iteration of the operational flow. If the provisioning section determines that all requests have been processed, then the operational flow ends.

Figure 6:
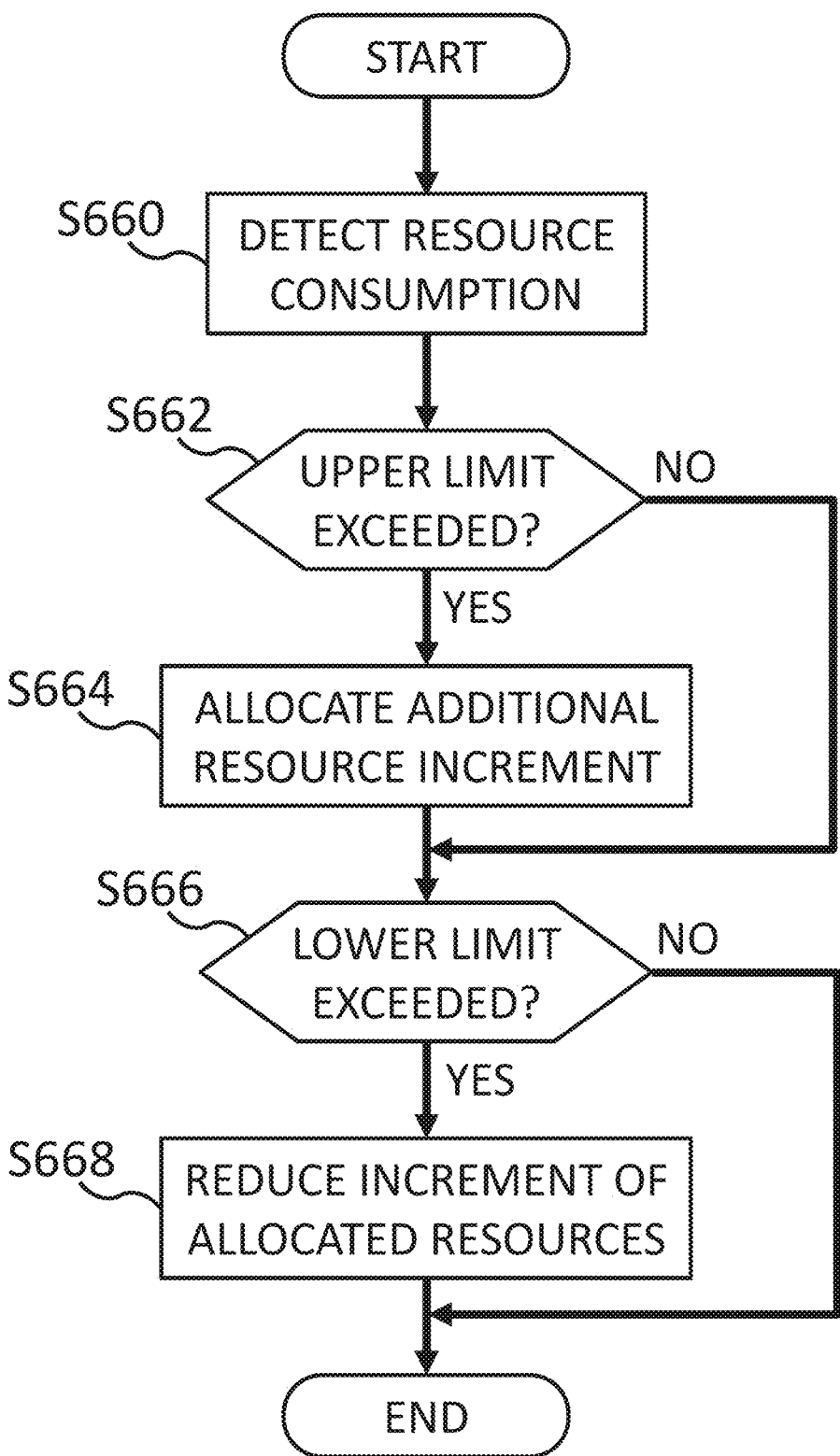
FIG. 6 is an operational flow for adjusting allocated resource amounts, according to at least some embodiments of the subject disclosure.

FIG. 6 is an operational flow for adjusting allocated resource amounts, according to at least some embodiments of the subject disclosure. The operational flow provides a method of adjusting allocated resource amounts. In at least some embodiments, the method is performed by a controller of a server including sections for performing certain operations, such as the controller and server shown in FIG. 8, which will be explained hereinafter.

At S660, the detecting section or a sub-section thereof detects resource consumption of one or more micro-services. In at least some embodiments, the detecting section detects, by the agent, a resource consumption amount of the micro-service. In at least some embodiments, the detecting section detects a number of processing threads awaiting execution and an amount of memory consumed.

At S662, the detecting section or a sub-section thereof determines whether an upper limit has been exceeded. In at least some embodiments, the detecting section determines whether the resource consumption amount is exceeding an upper resource consumption threshold value. In at least some embodiments, the upper resource consumption threshold value is a first proportion of the allocated resource amount. If the detecting section determines that the upper limit has been exceeded, then the operational flow proceeds to additional resource increment allocation at S664. If the detecting section determines that the upper limit has not been exceeded, then the operational flow proceeds to determine whether a lower limit has been exceeded at S666.

At S664, the allocating section or a sub-section thereof allocates an additional resource increment. In at least some embodiments, the allocating section increases, by the agent in response to the resource consumption amount exceeding an upper resource consumption threshold value, the allocated resource amount by a resource increment. In at least some embodiments, the allocating section increases the allocated resource amount by one CPU core. In at least some embodiments, the allocating section increases the allocated resource amount by one gigabyte of memory. In at least some embodiments, the allocating section increases the allocated resource amount by one CPU core and one gigabyte of memory.

At S666, the detecting section or a sub-section thereof determines whether a lower limit has been exceeded. In at least some embodiments, the detecting section determines whether the resource consumption amount is exceeding a lower resource consumption threshold value. In at least some embodiments, the lower resource consumption threshold value is a second proportion of the allocated resource amount. If the detecting section determines that the lower limit has been exceeded, then the operational flow proceeds to allocated resource increment reduction at S668. If the detecting section determines that the lower limit has not been exceeded, then the operational flow ends.

At S668, the allocating section or a sub-section thereof reduces an increment of allocated resources. In at least some embodiments, the allocating section reduces, by the agent in response to the resource consumption amount exceeding a lower resource consumption threshold value, the allocated resource amount by the resource increment. In at least some embodiments, the allocating section reduces the allocated resource amount by one CPU core. In at least some embodiments, the allocating section reduces the allocated resource amount by one gigabyte of memory. In at least some embodiments, the allocating section reduces the allocated resource amount by one CPU core and one gigabyte of memory.

Figure 7:
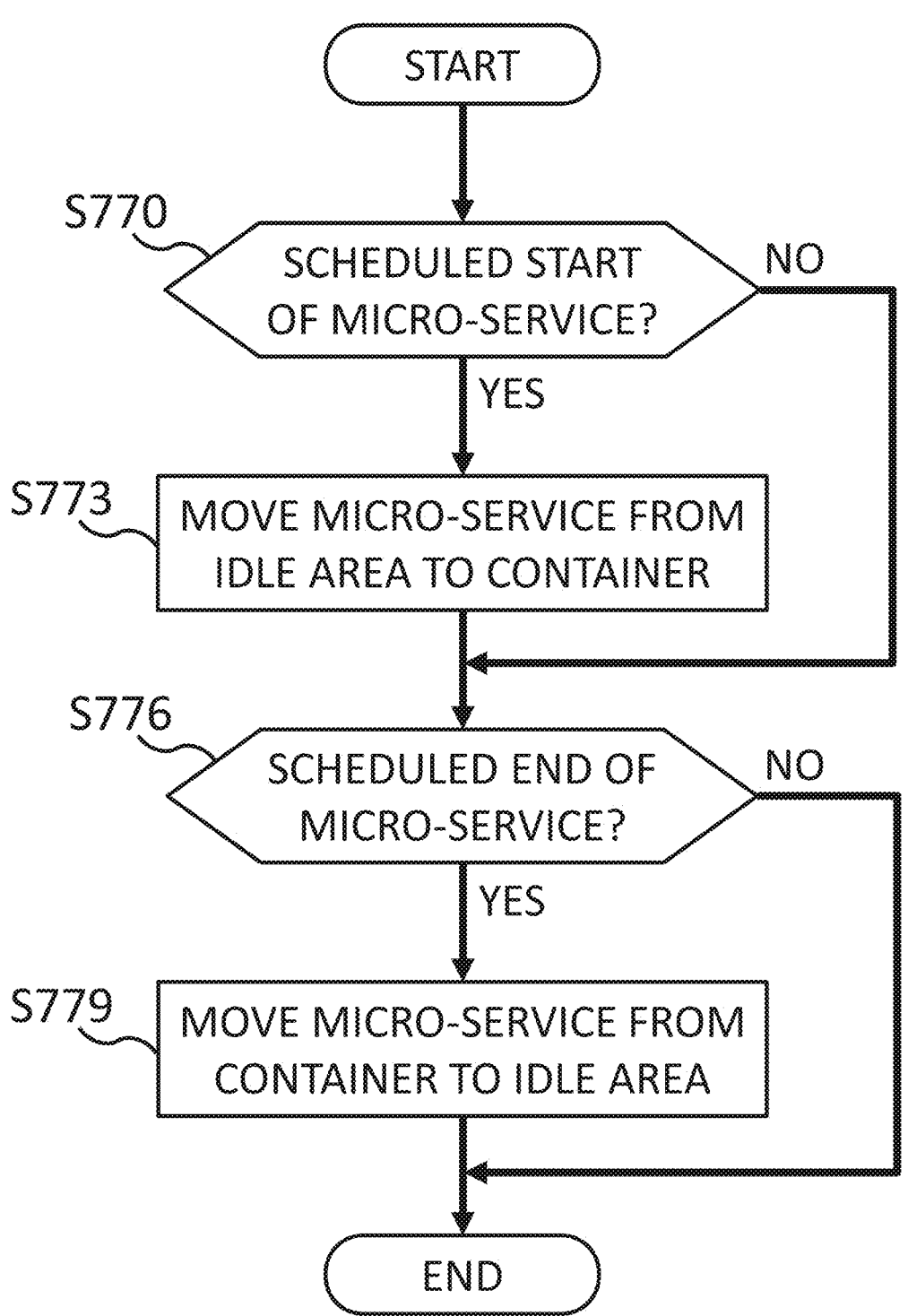
FIG. 7 is an operational flow for moving micro-services according to schedule, according to at least some embodiments of the subject disclosure.

FIG. 7 is an operational flow for moving micro-services according to schedule, according to at least some embodiments of the subject disclosure. The operational flow provides a method of moving micro-services according to schedule. In at least some embodiments, the method is performed by a controller of a server including sections for performing certain operations, such as the controller and server shown in FIG. 8, which will be explained hereinafter.

At S770, the scheduling section or a sub-section thereof determines whether a micro-service is scheduled to start. In at least some embodiments, the scheduling section compares a current time with a start time of a micro-service in the schedule. If the scheduling section determines that a micro-service is scheduled to start, then the operational flow proceeds to micro-service moving at S773. If the scheduling section determines that a micro-service is not scheduled to start, then the operational flow proceeds to determine whether a micro-service is scheduled to end at S776.

At S773, the allocating section or a sub-section thereof moves the micro-service from an idle area to a container. In at least some embodiments, the allocating section moves the micro-service from an idle area to a container at a start time of the schedule. In at least some embodiments, the allocating section instructs the provisioning section to provision the micro-service with dedicated resources from the resource pool.

At S776, the scheduling section or a sub-section thereof determines whether a micro-service is scheduled to end. In at least some embodiments, the scheduling section compares a current time with an end time of a micro-service in the schedule. If the scheduling section determines that a micro-service is scheduled to end, then the operational flow proceeds to micro-service returning at S773. If the scheduling section determines that a micro-service is not scheduled to end, then the operational flow ends.

At S779, the allocating section or a sub-section thereof returns the micro-service from the container to the idle area. In at least some embodiments, the allocating section returns the micro-service from the container to the idle area at an end time of the schedule. In at least some embodiments, the allocating section instructs the provisioning section to remove the dedicated resources from the micro-service to increase the amount of free resources in the resource pool.

Figure 8:
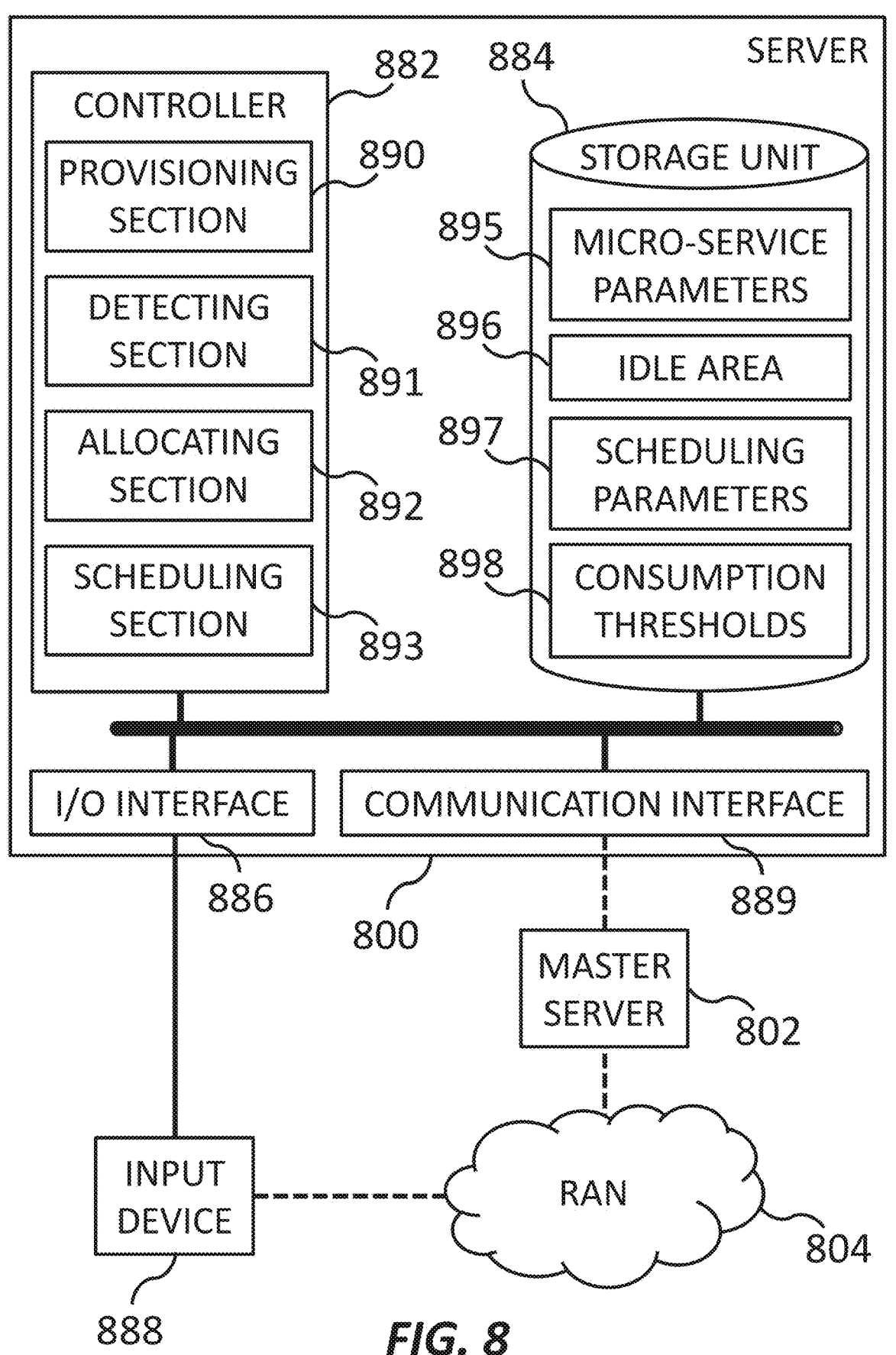
FIG. 8 is a block diagram of a hardware configuration for dynamic allocation of resources to application micro-services, according to at least some embodiments of the subject disclosure.

FIG. 8 is a block diagram of a hardware configuration for dynamic allocation of resources to application micro-services, according to at least some embodiments of the subject disclosure.

The exemplary hardware configuration includes server 800, which interacts with input device 888, and communicates with radio access network 804 through master server 802. In at least some embodiments, server 800 is a computer or other computing device that receives input or commands from input device 888. In at least some embodiments, server 800 is integrated with input device 888. In at least some embodiments, server 800 is a computer system that executes computer-readable instructions to perform operations for dynamic allocation of resources to application micro-services.

Server 800 includes a controller 882, a storage unit 884, an input/output interface 886, and a communication interface 889. In at least some embodiments, controller 882 includes a processor or programmable circuitry executing instructions to cause the processor or programmable circuitry to perform operations according to the instructions. In at least some embodiments, controller 882 includes analog or digital programmable circuitry, or any combination thereof. In at least some embodiments, controller 882 includes physically separated storage or circuitry that interacts through communication. In at least some embodiments, storage unit 884 includes a non-volatile computer-readable medium capable of storing executable and non-executable data for access by controller 882 during execution of the instructions. Communication interface 889 transmits and receives data from radio access network 804. Input/output interface 886 connects to various input and output units, such as input device 888, via a parallel port, a serial port, a keyboard port, a mouse port, a monitor port, and the like to accept commands and present information. In some embodiments, storage unit 884 is external from server 800.

Controller 882 includes provisioning section 890, detecting section 891, allocating section 892, and scheduling section 893. Storage unit 884 includes micro-service parameters 895, idle area 896, scheduling parameters 897, and consumption thresholds 898.

Provisioning section 890 is the circuitry or instructions of controller 882 configured to provision micro-services. In at least some embodiments, provisioning section 890 is configured to provision, by the agent, containers for micro-services on server 800 with an allocated resource amount. In at least some embodiments, provisioning section 890 utilizes information in storage unit 884, such as micro-service parameters 895. In at least some embodiments, provisioning section 890 includes sub-sections for performing additional functions, as described in the foregoing flow charts. In at least some embodiments, such sub-sections are referred to by a name associated with a corresponding function.

Detecting section 891 is the circuitry or instructions of controller 882 configured to detect resource consumption. In at least some embodiments, detecting section 891 is configured to determine whether the resource consumption amount is exceeding an upper resource consumption threshold value or a lower resource consumption threshold value. In at least some embodiments, detecting section 891 utilizes information in storage unit 884, such as consumption thresholds 898. In at least some embodiments, detecting section 891 includes sub-sections for performing additional functions, as described in the foregoing flow charts. In at least some embodiments, such sub-sections are referred to by a name associated with a corresponding function.

Allocating section 892 is the circuitry or instructions of controller 882 configured to allocate computational resources. In at least some embodiments, allocating section 892 is configured to increase, by the agent in response to the resource consumption amount exceeding an upper resource consumption threshold value, the allocated resource amount by a resource increment. In at least some embodiments, allocating section 892 is configured to reduce, by the agent in response to the resource consumption amount exceeding a lower resource consumption threshold value, the allocated resource amount by the resource increment. In at least some embodiments, allocating section 892 utilizes information from storage unit 884, such as consumption thresholds 898, and records information to storage unit 884, such as micro-service parameters 895. In at least some embodiments, allocating section 892 includes sub-sections for performing additional functions, as described in the foregoing flow charts. In at least some embodiments, such sub-sections are referred to by a name associated with a corresponding function.

Scheduling section 893 is the circuitry or instructions of controller 882 configured to schedule start times and end times of micro-services. In at least some embodiments, scheduling section 893 is configured to compare a current time with start times and end times of micro-services in the schedule. In at least some embodiments, scheduling section 893 utilizes information from storage unit 884, such as scheduling parameters 897. In at least some embodiments, scheduling section 893 includes sub-sections for performing additional functions, as described in the foregoing flow charts. In at least some embodiments, such sub-sections are referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the subject disclosure.

While embodiments of the subject disclosure have been described, the technical scope of any subject matter claimed is not limited to the above-described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory computer-readable medium including instructions executable by a processor to cause the processor to perform operations comprising:

receiving, by an agent executed on a server of a cloud computing environment, a request to provision a container for a micro-service of an application;

provisioning, by the agent, the container for the micro-service on the worker server with an allocated resource amount;

detecting, by the agent, a resource consumption amount of the micro-service;

increasing, by the agent in response to the resource consumption amount exceeding an upper resource consumption threshold value, the allocated resource amount by a resource increment;

reducing, by the agent in response to the resource consumption amount exceeding a lower resource consumption threshold value, the allocated resource amount by the resource increment;

receiving, by the agent, a schedule associated with the micro-service;

moving the micro-service from an idle area to a container at a start time of the schedule; and returning the micro-service from the container to the idle area at an end time of the schedule.

2. The computer-readable medium of claim 1, wherein the idle area is a reserved Random Access Memory (RAM) area controlled by an operating system kernel of the server.

3. The computer-readable medium of claim 2, wherein the agent receives a plurality of requests, each request to provision a container among a plurality of containers for a micro-service among a plurality of micro-services of the application; and the agent provisions the plurality of containers for the plurality of micro-services of the application.

4. The computer-readable medium of claim 3, wherein the agent receives a schedule associated with each micro-service among the plurality of micro-services; and the agent staggers the start times and the end times among the plurality of schedules associated with the plurality of micro-services.

5. The computer-readable medium of claim 3, wherein the agent provisions a plurality of containers for a plurality of micro-services of a second application.

6. The computer-readable medium of claim 1, wherein the upper resource consumption threshold value is a first proportion of the allocated resource amount, and the lower resource consumption threshold value is a second proportion of the allocated resource amount.

7. The computer-readable medium of claim 1, wherein the application is one of a Central Unit (CU) application and a Distributed Unit (DU) application of an Open Radio Access Network (O-RAN) system.

8. A method comprising:

receiving, by an agent executed on a server of a cloud computing environment, a request to provision a container for a micro-service of an application;

provisioning, by the agent, the container for the micro-service on the worker server with an allocated resource amount;

detecting, by the agent, a resource consumption amount of the micro-service;

13 increasing, by the agent in response to the resource consumption amount exceeding an upper resource consumption threshold value, the allocated resource amount by a resource increment;

reducing, by the agent in response to the resource consumption amount exceeding a lower resource consumption threshold value, the allocated resource amount by the resource increment;

receiving, by the agent, a schedule associated with the micro-service;

moving the micro-service from an idle area to a container at a start time of the schedule; and returning the micro-service from the container to the idle area at an end time of the schedule.

9. The method of claim 8, wherein the idle area is a reserved Random Access Memory (RAM) area controlled by an operating system kernel of the server.

10. The method of claim 8, wherein the agent receives a plurality of requests, each request to provision a container among a plurality of containers for a micro-service among a plurality of micro-services of the application; and the agent provisions the plurality of containers for the plurality of micro-services of the application.

11. The method of claim 10, wherein the agent receives a schedule associated with each micro-service among the plurality of micro-services; and the agent staggers the start times and the end times among the plurality of schedules associated with the plurality of micro-services.

12. The method of claim 10, wherein the agent provisions a plurality of containers for a plurality of micro-services of a second application.

13. The method of claim 8, wherein the upper resource consumption threshold value is a first proportion of the allocated resource amount, and the lower resource consumption threshold value is a second proportion of the allocated resource amount.

14

14. The method of claim 8, wherein the application is one of a Central Unit (CU) application and a Distributed Unit (DU) application of an Open Radio Access Network (O-RAN) system.

15. A server comprising:

a controller including circuitry configured to:

receive, by an agent executed on a server of a cloud computing environment, a request to provision a container for a micro-service of an application;

provision, by the agent, the container for the micro-service on the worker server with an allocated resource amount;

detect, by the agent, a resource consumption amount of the micro-service;

increase, by the agent in response to the resource consumption amount exceeding an upper resource consumption threshold value, the allocated resource amount by a resource increment;

reduce, by the agent in response to the resource consumption amount exceeding a lower resource consumption threshold value, the allocated resource amount by the resource increment;

receive, by the agent, a schedule associated with the micro-service;

move the micro-service from an idle area to a container at a start time of the schedule; and return the micro-service from the container to the idle area at an end time of the schedule.

16. The apparatus of claim 15, wherein the idle area is a reserved Random Access Memory (RAM) area controlled by an operating system kernel of the server.

17. The apparatus of claim 15, wherein the agent receives a plurality of requests, each request to provision a container among a plurality of containers for a micro-service among a plurality of micro-services of the application; and the agent provisions the plurality of containers for the plurality of micro-services of the application.

* * * * *